United States Patent [19]
Asaida et al.

[11] Patent Number: 5,659,356
[45] Date of Patent: Aug. 19, 1997

[54] DIGITAL VIDEO CAMERA APPARATUS AND ASPECT RATIO CONVERTING APPARATUS

[75] Inventors: Takashi Asaida; Takashi Kameyama, both of Kanagawa, Japan

[73] Assignee: Sony Corporation, Tokyo, Japan

[21] Appl. No.: 600,947

[22] PCT Filed: Jun. 28, 1995

[86] PCT No.: PCT/JP95/01287

§ 371 Date: Feb. 21, 1996

§ 102(e) Date: Feb. 21, 1996

[87] PCT Pub. No.: WO96/01026

PCT Pub. Date: Jan. 11, 1996

[30] Foreign Application Priority Data

Jun. 29, 1994 [JP] Japan .................... 6-148305

[51] Int. Cl.$^6$ .................... H04N 5/228; H04N 11/20
[52] U.S. Cl. .................... 348/222; 348/445; 348/264; 348/265
[58] Field of Search .................... 348/222, 239, 348/240, 445, 441, 262, 264, 265, 556; 341/61; H04N 7/01, 11/20, 5/46, 5/228

[56] References Cited

U.S. PATENT DOCUMENTS

| 5,323,235 | 6/1994 | Tonomura | 348/445 |
| 5,416,598 | 5/1995 | Ezaki | |
| 5,444,492 | 8/1995 | Kihara | 348/445 |
| 5,521,637 | 5/1996 | Asaida | 348/222 |

FOREIGN PATENT DOCUMENTS

| 0576215 | 12/1993 | European Pat. Off. |
| 3-198486 | 8/1991 | Japan . |
| 4-127670 | 4/1992 | Japan . |
| 4-316284 | 11/1992 | Japan . |
| 5-199547 | 8/1993 | Japan . |
| 5-252538 | 9/1993 | Japan . |
| 6-6810 | 1/1994 | Japan . |

Primary Examiner—Sherrie Hsia
Attorney, Agent, or Firm—William S. Frommer; Alvin Sinderbrand

[57] ABSTRACT

In a time axis converting section 10, time axis conversion processing of 4/3 times is implemented to a digital picture signal of a first data rate indicating an image of a first aspect ratio (16:9) to thereby generate a digital picture signal of a second data rate indicating an image of a second aspect ratio (4:3). In a data rate converting section 20, data rate conversion processing of conversion ratio of 3:4 is implemented to the digital picture signal of the second data rate to thereby generate, from the digital picture signal of the first data rate indicating the image of the first aspect ratio (16:9), a digital picture signal of a first data rate indicating the image of the second aspect ratio (4:3).

14 Claims, 14 Drawing Sheets

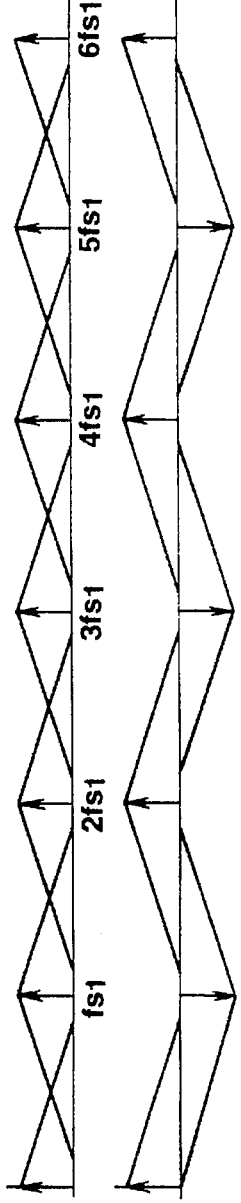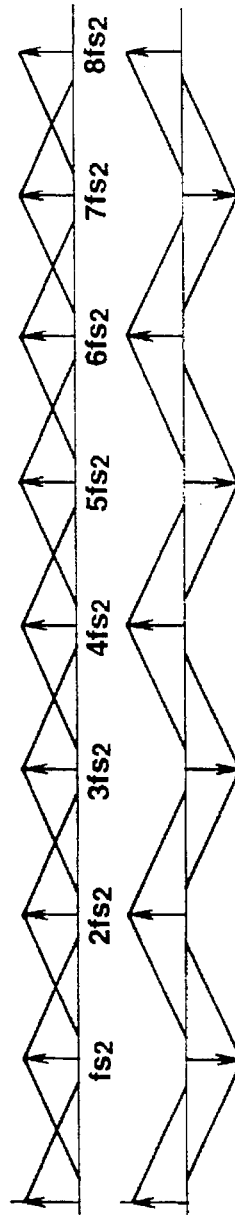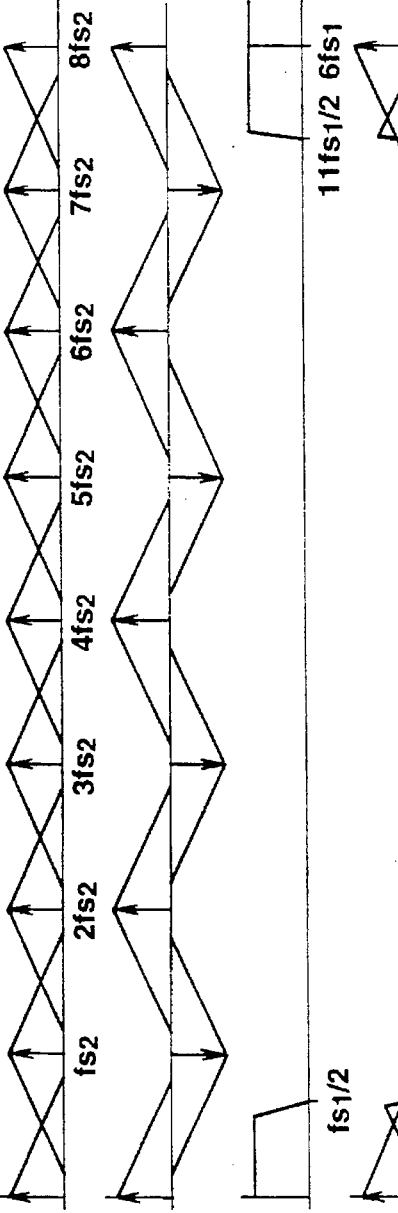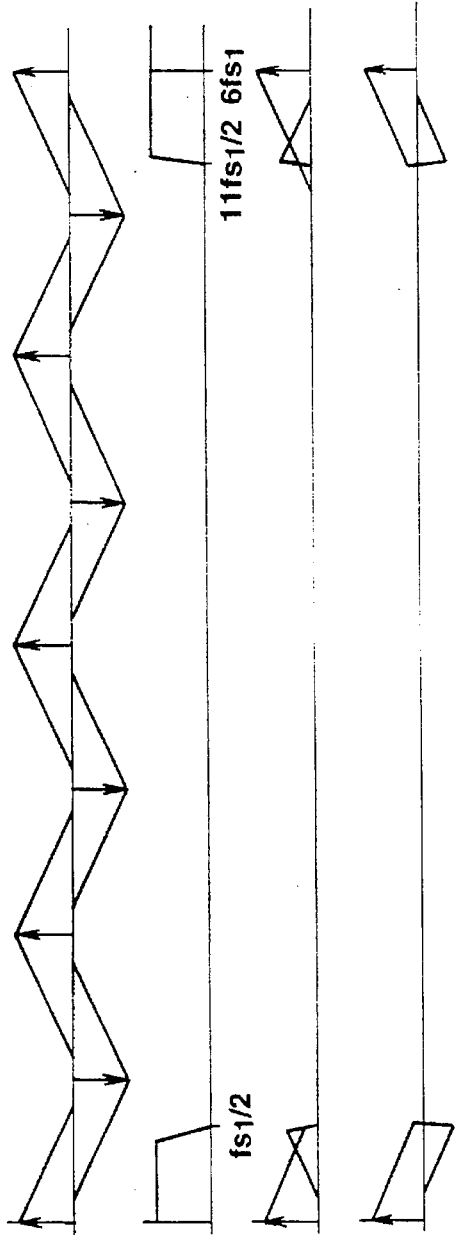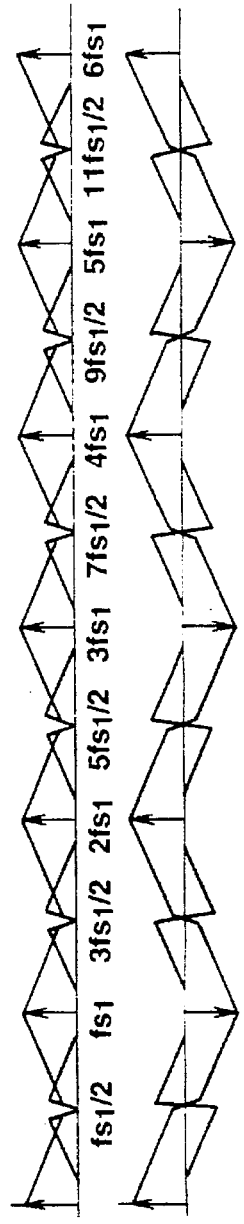
FIG.2(A) IMAGE PICK-UP OUTPUT G(fs1)
FIG.2(B) IMAGE PICK-UP OUTPUT R(fs1), B(fs1)
FIG.2(C) FIFO OUTPUT G(fs2)
FIG.2(D) FIFO OUTPUT R(fs2), B(fs2)
FIG.2(E) INTERPOLATION FILTER MTF
FIG.2(F) OVER-SAMPLING OUTPUT G(6fs1)
FIG.2(G) OVER-SAMPLING OUTPUT R(6fs2), B(6fs2)
FIG.2(H) DOWN-SAMPLING OUTPUT G(fs1)
FIG.2(I) DOWN-SAMPLING OUTPUT R(fs1), B(fs1)

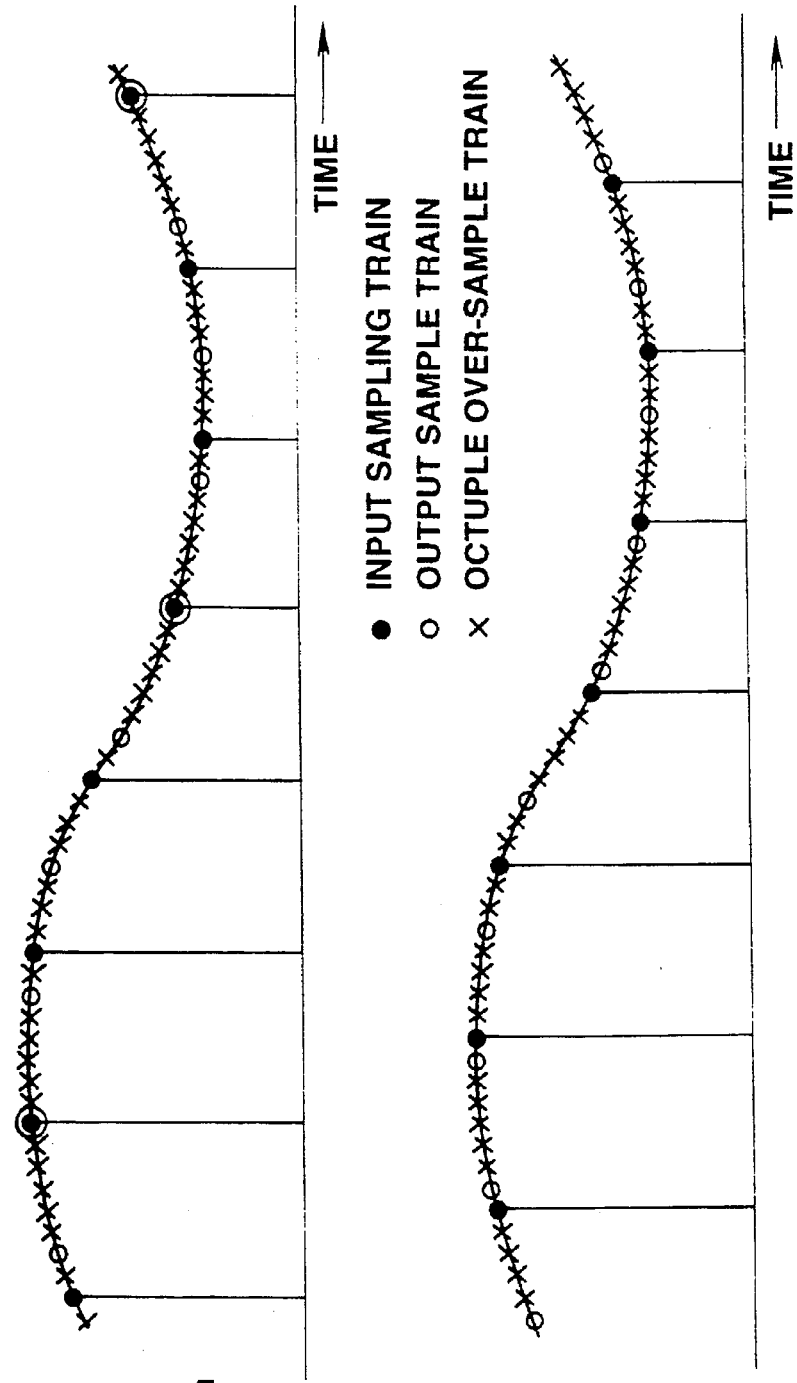

| TIME | INPUT | OUTPUT | | | |
|---|---|---|---|---|---|
| | | REGISTER 21 | REGISTER 22 | REGISTER 23 | REGISTER 24 |
| t0 | D | C | B | B | A |
| t1 | E | D | C | B | B |
| t2 | E | E | D | C | B |
| t3 | F | E | E | D | C |
| t4 | G | F | E | E | D |

FIG.9

| TIME | INPUT | OUTPUT | | | |
|---|---|---|---|---|---|
| | | REGISTER 21 | REGISTER 22 | REGISTER 23 | REGISTER 24 |
| t0 | E | D | C | B | A |
| t1 | F | E | D | C | B |
| t2 | F | E | D | C | B |
| t3 | G | F | E | D | C |
| t4 | H | G | F | E | D |

(t2 and t3 columns of REGISTER 24: STOP OF CLOCK)

FIG.13

| COE 1 | COE 2 | COE 3 | COE 4 |
|---|---|---|---|
| -1 | 8 | 60 | -3 |
| -3 | 26 | 46 | -5 |
| -5 | 46 | 26 | -3 |
| -3 | 60 | 8 | -1 |

FIG.14

| COE 1 | COE 2 | COE 3 | COE 4 |
|---|---|---|---|
| -2 | 16 | 55 | -5 |
| -5 | 37 | 37 | -5 |
| -5 | 55 | 16 | -2 |
| 1 | 62 | 1 | 0 |

FIG.15

DIGITAL VIDEO CAMERA APPARATUS AND ASPECT RATIO CONVERTING APPARATUS

TECHNICAL FIELD

This invention relates to a digital video camera apparatus having an aspect ratio converting function, and an aspect ratio converting apparatus adapted for converting an aspect ratio of a digital picture signal from a first aspect ratio to a second aspect ratio.

BACKGROUND ART

In recent years, against the existing standard television system such as the NTSC system or the PAL system, etc., which handles images (pictorial images) of aspect ratio of 4:3, new television systems to handle images (pictorial images) of the wide aspect ratio of 16:9, such as, for example, EDTV (Extended Definition Television) system have been proposed, and video equipments adapted for handling images of plural aspect ratios are being put into practical use.

The applicant of this application has already proposed, as disclosed in, e.g., the Japanese Patent Application Laid Open No. 316284/1992 publication, a video camera apparatus in which an aspect ratio converting circuit for converting a digital picture signal of the wide aspect ratio of 16:9 into a digital picture signal of the aspect ratio of 4:3 is provided, thereby making it possible to cope with both the standard television system and the television system of the wide aspect ratio. In the above-mentioned aspect ratio converting circuit, a digital picture signal of the wide aspect ratio of 16:9 is converted into a digital picture signal of the aspect ratio of 4:3 by the time axis expansion of 4/3 times at the H period.

Meanwhile, when the digital picture signal of the aspect ratio of 4:3 is generated from the digital picture signal of the wide aspect ratio of 16:9 by the time axis expansion processing of 4/3 times, the sampling frequency $f_{s2}$ of the digital picture signal of the aspect ratio of 4:3 would become $f_{s2}=(3/4)f_{s1}$ with respect to the sampling frequency $f_{s1}$ of the digital picture signal of the wide aspect ratio of 16:9. Accordingly, the video camera apparatus provided with the aspect ratio converting circuit is required to handle digital picture signals of two kinds of sampling frequencies $f_{s1}$, $f_{s2}$ in the digital signal processing system such as γ correction, etc. of the succeeding stage. For this reason, signal processing systems of two systems must be used with respect to two kinds of sampling frequencies $f_{s1}$, $f_{s2}$, or respective circuits must be caused to cope with both sampling frequencies $f_{s1}$, $f_{s2}$. This leads to complicated circuit and increase in the circuit scale, etc.

Moreover, if an approach is employed to carry out the aspect ratio conversion of color image by luminance/color difference system such as Y, U, V or Y, I, Q, etc., in the case where the Spatial Offset Method is employed in the imaging (image pick-up) system so that high resolution is provided, since the sampling frequency of the luminance signal Y is twice greater than that of the three prime color system of R, G, B by reflection of the Spatial Offset effect, high speed data processing is required. As a result, realization thereof is difficult.

Further, in the case where the aspect ratio conversion is carried out by the composite signal, when time axis conversion processing is implemented to the composite signal, the frequency of sub-carrier would be changed. As a result, it becomes impossible to use it as the composite signal. For this reason, the time or labor for decoding in advance and/or post encoding which are to be to be required not only becomes wasteful, but also injures the picture quality.

In view of actual circumstances as described above, an object of this invention is to provide a digital video camera apparatus capable of generating, from an analog image pick-up signal having a first aspect ratio obtained by imaging means, an output digital picture signal of a first sampling rate having a second aspect ratio different from the first aspect ratio to output it.

Another object of this invention is to provide a digital video camera apparatus having a function to carry out aspect ratio conversion of color image.

A further object of this invention is to provide a digital video camera apparatus having a function to carry out aspect ratio conversion with respect to three prime color signals obtained by imaging means employing the Spatial Offset Method.

A further object of this invention is to provide an aspect ratio converting apparatus capable of generating, from an input digital picture signal of a first sampling rate indicating an image of a first aspect ratio, an output digital picture signal of a first sampling rate indicating an image of a second aspect ratio.

A further object of this invention is to provide an aspect ratio converting apparatus capable of carrying out aspect ratio conversion of color image.

A further object of this invention is to provide an aspect ratio converting apparatus capable of carrying out aspect ratio conversion with respect to three prime color digital picture signals obtained by respectively digitizing, by a first sampling rate, three prime color signals obtained by imaging means employing the Spatial Offset Method.

A further object of this invention is to provide an aspect ratio converting apparatus capable of carrying out aspect ratio conversion by a single clock.

DISCLOSURE OF THE INVENTION

A digital video camera apparatus according to this invention is characterized in that it includes imaging means for outputting an analog image pick-up signal, analog/digital converting means for converting the analog image pick-up signal into an input digital picture signal of a first data rate having a first aspect ratio, and aspect ratio converting means for converting the input digital picture signal into an output digital picture signal of the first data rate having a second aspect ratio different from the first aspect ratio.

In the digital video camera apparatus according to this invention, the imaging means outputs, by the Spatial Offset Method, a first analog image pick-up signal of a first sampling rate equal to the first data rate and a second analog image pick-up signal of the first sampling rate different from the first analog image pick-up signal in terms of the spatial sampling position. Moreover, the analog/digital converting means converts the first analog image pick-up signal into a first input digital picture signal of the first data rate having a first spatial sampling phase, and converts the second analog image pick-up signal into a second input digital picture signal of the first data rate having a second spatial sampling phase in which phase difference with respect to the first spatial sampling phase corresponds to difference of the spatial sampling position with respect to the second analog image pick-up signal of the first analog image pick-up signal. Further, the aspect ratio converting means converts the first input digital picture signal into a first output digital picture signal having the second aspect ratio at the first data rate having a third spatial sampling phase, and converts the second input digital picture signal into a second output digital picture signal having the second aspect ratio at the first data rate having a fourth spatial sampling phase in which phase difference with respect to the third spatial sampling phase corresponds to difference of the spatial sampling position with respect to the second analog image pick-up signal of the first analog image pick-up signal.

Moreover, the digital video camera apparatus according to this invention is characterized in that spatial sampling phase difference between the first analog image pick-up signal and the second analog image pick-up signal is $\pi$.

Further, the digital video camera apparatus according to this invention is characterized in that spatial sampling phase difference between the first output digital picture signal and the second output digital picture signal is $\pi$.

Further, the digital video camera apparatus according to this invention is characterized in that it further comprises selector means for selectively outputting the input digital picture signal and the output digital picture signal.

Further, the digital video camera apparatus according to this invention is characterized in that it further comprises signal processing means for carrying out signal processing at a clock rate related to the first data rate with respect to a digital picture signal selected by the selector means.

Further, the digital video camera apparatus according to this invention is characterized in that the signal processing means carries out signal processing at a clock rate of multiple of integer of the first data rate.

Further, the digital video camera apparatus according to this invention is characterized in that the first aspect ratio is 16:9 and the second aspect ratio is 4:3, and that the aspect ratio converting means comprises time axis converting means for implementing time axis conversion to the input digital picture signal to thereby form a digital picture signal of the second data rate different from the first data rate having the second aspect ratio, and data rate converting means for substantially carrying out over-sampling of 4n times (n is positive integer) and down-sampling of 1/3n times with respect to the digital picture signal delivered from the time axis converting means.

Further, the digital video camera apparatus according to this invention comprises, every color signals of red, blue and green, three systems of the imaging means, the analog/digital converting means and the aspect ratio converting means to carry out converting operations of aspect ratios every spective color signals.

Further, the digital video camera apparatus according to this invention is characterized in that the aspect ratio converting means is composed of memory means for writing the input digital picture signal at a first clock rate equal to the first data rate to carry out read-out operation by a signal of the first clock rate thinned so that its clock rate substantiality becomes equal to a second clock rate different from the first clock rate to output a digital picture signal of the second data rate substantially equal to the second clock rate, and data rate converting means for converting the digital picture signal of the second data rate outputted from the memory means into the output digital picture signal of the first data rate.

An aspect ratio converting apparatus according to this invention is characterized in that it comprises aspect ratio converting means for converting an input digital picture signal of a first data rate having a first aspect ratio into a digital picture signal of a second data rate different from the first data rate having a second aspect ratio different from the first aspect ratio, and data rate converting means for implementing data rate conversion to the digital picture signal delivered from the aspect ratio converting means to thereby generate an output digital picture signal of the first data rate having the second aspect ratio.

The aspect ratio converting apparatus according to this invention is characterized in that the input digital picture signal consists of a first input digital picture signal of the first data rate having a first spatial sampling phase and a second input digital picture signal of the first data rate having a second spatial sampling phase different from the first input digital picture signal in terms of the spatial sampling position, and that the aspect ratio converting means converts the first input digital picture signal into a first output digital picture signal having the second aspect ratio at the first data rate having a third spatial sampling phase, and converts the second input digital picture signal into a second output digital picture signal having the second aspect ratio at the first data rate having a fourth spatial sampling phase in which phase difference with respect to the third spatial sampling phase corresponds to difference of the spatial sampling position with respect to the second input digital picture signal of the first input digital picture signal.

Moreover, the aspect ratio converting apparatus according to this invention is characterized in that spatial sampling phase difference between the first input digital picture signal and the second input digital picture signal is $\pi$.

Further, the aspect ratio converting apparatus according to this invention is characterized in that spatial sampling phase difference between the first output digital picture signal and the second output digital picture signal is $\pi$.

Further, the aspect ratio converting apparatus according to this invention is characterized in that the first aspect ratio is 16:9 and the second aspect ratio is 4:3, and that the aspect ratio converting means comprises time axis converting means for implementing time axis conversion to the input digital picture signal to thereby form a digital picture signal of the second data rate having the second aspect ratio, and data rate converting means for substantially carrying out over-sampling of 4n times (n is positive integer) and down sampling of 1/3n times with respect to the digital picture signal delivered from the time axis converting means.

In addition, the aspect ratio converting apparatus according to this invention comprises, every color signals of red, blue and green, three systems of the aspect ratio converting means to carry out converting operations of aspect ratios every respective color signals.

BRIEF DESCRIPTION OF THE DRAWINGS

FIGS. 2A–2I are view showings, in a model form, by signal spectrum, the operation in the frequency region of the aspect ratio converting unit in the digital video camera apparatus.

FIGS. 3A–3B are view showings, in a model form, by data train, the operation in the time region of the aspect ratio converting unit in the digital video camera apparatus.

FIG. 9 is a view showing, in a model form, output contents at respective timings of registers of sampling rate converting section in the aspect ratio converting apparatus operative at the operation timings shown in FIG. 8.

FIG. 13 is a view showing, in a model form, output contents at respective timings of registers of sampling rate converting section in the aspect ratio converting apparatus operative at the operation timings shown in FIG. 12.

FIG. 14 is a view showing an example of filter coefficients of the aspect ratio converting unit in the digital video camera apparatus.

FIG. 15 is a view showing another example of filter coefficients of the aspect ratio converting unit in the digital video camera apparatus.

BEST MODE FOR CARRYING OUT THE INVENTION

A preferred embodiment of this invention will now be described in detail with reference to the attached drawings.

Figure 1:
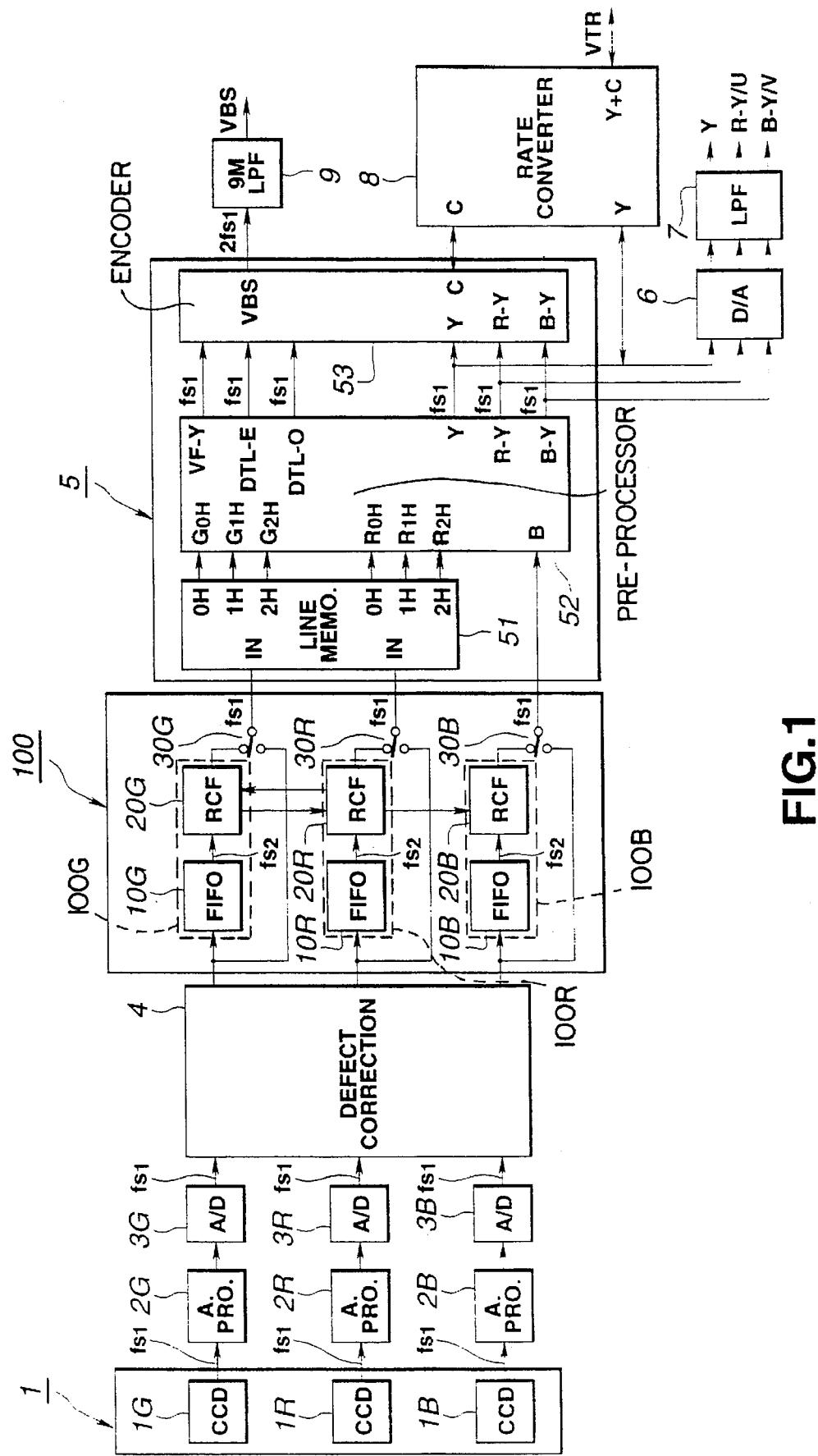
FIG. 1 is a block circuit diagram showing the configuration of a digital video camera apparatus to which an aspect ratio converting unit (apparatus) according to this invention is applied.

A digital video camera apparatus according to this invention is constituted as shown in FIG. 1, for example.

The digital video camera apparatus shown in FIG. 1 includes an imaging (image pick-up) section 1 composed of three CCD image sensors 1R, 1G, 1B for imaging three prime color pictures (pictorial images) each having aspect ratio of 16:9 of object image, wherein respective color image pick-up signals $R(f_{s1})$, $G(f_{s1})$, $B(f_{s1})$ which have been read out by the transfer clock of $f_{s1}$ ($f_{s1}$=18 MHz) rate from the CCD image sensors 1R, 1G, 1B as image pick-up outputs by the CCD image sensors 1R, 1G, 1B are respectively delivered to A/D converters 3R, 3G, 3B through analog signal processing sections 2R, 2G, 2B, whereby the respective color image pick-up signals $R(f_{s1})$, $G(f_{s1})$, $B(f_{s1})$ are digitized by a first sampling clock of $f_{s1}$ rate by the A/D converters 3R, 3G, 3B.

In this embodiment, the imaging section 1 employs the Spatial Offset Method, wherein respective CCD image sensors 1R, 1B for imaging red picture (pictorial image) and blue picture (pictorial image) are disposed in the state where they are shifted in a horizontal direction by ½ of the spatial sampling period $\tau_s$ of pixel with respect to the CCD image sensor 1G for imaging green picture (pictorial image). Moreover, the three CCD image sensors 1R, 1G, 1B are respectively CCD image sensors having, e.g., 500000 pixels and are driven at $f_{s1}$ ($f_{s1}$=18 MHz) rate by drive clock that timing generator (not shown) generates, whereby respective color image pick-up signals R, G, B are read out at the $f_{s1}$ rate. Signal spectrum component of green image pick-up signal $G(f_{s1})$ obtained by spatially sampling an object image by means of the CCD image sensor 1G is shown in (A) of FIG. 2, and respective signal spectrum components of red image pick-up signal $R(f_{s1})$ and blue image pick-up signal $B(f_{s1})$ obtained by spatially sampling the object image by means of the CCD image sensors 1R, 1B are shown in (B) of FIG. 2. As seen from such illustration, the green image pick-up signal $G(f_{s1})$ and the red and blue image pick-up signals $R(f_{s1})$ and $B(f_{s1})$ are shifted by $\pi$ in terms of the spatial sampling phase.

It is to be noted that phases of clocks for signal processing with respect to the green image pick-up signal $G(f_{s1})$, and the red image pick-up signal $R(f_{s1})$ and blue image pick-up signal $B(f_{s1})$ are in correspondence with each other.

Moreover, in the respective analog signal processing sections 2R, 2G, 2B, with respect to color image pick-up signals $R(f_{s1})$, $G(f_{s1})$, $B(f_{s1})$ obtained by the CCD image sensors 1R, 1G, 1B, analog signal processing including various level adjustments such as noise elimination by the CDS (Correlated Double Sampling), gain adjustment, black balance or white balance, shading correction or the like is carried out.

Further, the respective A/D converters 3R, 3G, 3B serve to carry out A/D conversion processing synchronous with drive clock having a predetermined phase at $f_{s1}$ rate equal to the sampling rates of the respective analog color image pick-up signals $R(f_{s1})$, $G(f_{s1})$, $B(f_{s1})$, i.e., digitize, at the $f_{s1}$ rate, respective color image pick-up signals $R(f_{s1})$, $G(f_{s1})$, $B(f_{s1})$ of the $f_{s1}$ rate.

Further, the digital video camera apparatus includes a defect correction processing section 4 supplied with respective color digital picture signals $R(f_{s1})$, $G(f_{s1})$, $B(f_{s1})$ digitized by the A/D converters 3R, 3G, 3B. Respective color digital picture signals $R(f_{s1})$, $G(f_{s1})$, $B(f_{s1})$ to which the defect correction processing with respect to defect pixel or pixels of the CCD image sensors 1R, 1G, 1B has been implemented by the defect correction processing section 4 are delivered to an aspect ratio converting apparatus (unit) 100 according to this invention.

The aspect ratio converting unit 100 comprises aspect ratio converting sections 100R, 100G, 100B of three systems respectively composed of a time axis converting section 10R, data rate converting section 20R and an output select switch a time axis converting section 10G, a data rate converting section 20G and an output select switch 30G; and a time axis converting section 10B, a data rate converting section 20B, and an output select switch 30B.

The time axis converting sections 10R, 10G, 10B are respectively composed of FIFO memories. An approach is employed to write respective color digital picture signals $R(f_{s1})$, $G(f_{s1})$, $B(f_{s1})$ to which the defect correction processing has been implemented by the defect correction processing section 4 into the respective FIFO memories at a sampling clock of the first sampling rate $f_{s1}$ to implement thinning to the write clocks of the first clock frequency $f_{s1}$ at a rate of one to four clock pulses so that the clock is caused to substantially have a second sampling rate, i.e., $(3/4) f_{s1}$ rate to read out respective color digital picture signals from the FIFO memories by using the above-mentioned clock to thereby generate respective color digital picture signals $R(f_{s2})$, $G(f_{s2})$, $B(f_{s2})$ of a second aspect ratio having signal spectrum components as shown in (C), (D) of FIG. 2.

Moreover, the data rate converting sections 20R, 20G, 20B are respectively comprised of rate converters each constituted by a pre-register type-FIR filter which sequentially carries out switching between filter coefficients at the output rate $f_{s1}$ to conduct filtering processing, and serve to carry out octuple (eight times) over-sampling by means of interpolation filter of the MTF characteristic having zero point at $f_{s1}/2$ as shown in (E) of FIG. 2 with respect to the color digital picture signals $R(f_2)$, $G(f_2)$, $B(f_2)$ of the second aspect ratio to thereby substantially carry out processing as shown in (E) to (I) of FIG. 2. Namely, the data rate converting sections generate respective color image pick-up data $R(6f_{s1})$, $G(6f_{s1})$, $B(6f_{s1})$ of the second aspect ratio having respective signal spectrum components as shown in (F), (G) of FIG. 2 thereafter to carry out down-sampling into 1/6 to thereby generate respective color digital picture signals $R(f_{s1})$, $G(f_{s1})$, $B(f_{s1})$ of the second aspect ratio.

At this time, in correspondence with the Spatial Offset Method, down-sampling into 1/6 is carried out by the phase in which the red digital picture signal $R(6f_{s1})$ and the blue digital picture signal $B(6f_{s1})$ are respectively shifted by $\pi$ with respect to the green digital picture signal $G(6f_{s1})$, i.e., the phase corresponding to the Spatial Offset. Thus, respective color digital picture signals $R(f_{s1})$, $G(f_{s1})$, $B(f_{s1})$ of the second aspect ratio having respective signal spectrum components as shown in (H), (I) of FIG. 2 are generated. It is to be noted that in regard to the green digital picture signal $G(6f_{s1})$ and the red and blue digital picture signals $R(6f_{s1})$, $B(6f_{s1})$ in which their phase are shifted to each other by $\pi$, phases of clocks for signal processing are in correspondence with each other.

Namely, at the data rate converting sections 20R, 20G, 20B, with respect to respective color digital picture signals $R(f_{s2})$, $G(f_{s2})$, $B(f_{s2})$ of the second aspect ratio obtained by the time axis converting sections 10R, 10G, 10B, respective data rate converting operations in the time regions of the data rate converting section 20G and the data rate converting sections 20R, 20B are carried out. Namely, as shown in (A) and (B) of FIG. 3, octuple (eight times) over-sampling is carried out with respect to respective input sample trains of (3/4) $f_{s1}$ rate indicated by the mark ● to thereby generate octuple over-sample train of the $6f_{s1}$ rate indicated by the mark X to take out data from the octuple (eight times) over-sample train every other seventh sample (at intervals of six samples) to thereby carry out down-sampling into 1/6 to thereby generate an output sample train of $f_{s1}$ rate as indicated by the mark ○.

In the respective data rate converting operations in the data rate converting sections 20R, 20G, 20B, it is sufficient to carry out operation of output sample train of the $f_{s1}$ rate indicated by the mark ○ actually outputted. Therefore, since operations of data except for the output sample train are useless, it is not required to carry out the over-sampling and the down-sampling with respect to all data as they are.

In the aspect ratio converting apparatus 100 of such a configuration, at the three systems of the data rate converting sections 20R, 20G, 20B, 1/6 down-sampling is substantially carried out by the phase corresponding to the Spatial Offset to thereby carry out the aspect ratio conversion with respect to three prime color digital picture signals $R(f_{s1})$, $G(f_{s1})$, $B(f_{s1})$ obtained by respectively digitizing, at the first data rate $f_{s1}$, three prime color signals obtained by the imaging section 1 employing the Spatial Offset Method. Further, this aspect ratio converting unit 100 is adapted so that respective color digital picture signals $R(f_{s1})$, $G(f_{s1})$, $B(f_{s1})$ of the first aspect ratio or respective color digital picture signals $R(f_{s1})$, $G(f_{s1})$, $B(f_{s1})$ of the second aspect ratio are outputted, at the first data rate selected by the output select switches 30R, 30G, 30B switched by designation of user, from the aspect ratio converting sections 100R, 100G, 100B of the three systems.

As stated above, in this digital video camera apparatus, switching between the output select switches 30R, 30G, 30B is carried out by designation of user, thereby making it possible to output respective color digital picture signals $R(f_{s1})$, $G(f_{s1})$, $B(f_{s1})$ of the first aspect ratio at the first data rate $f_{s1}$ or respective color digital picture signals $R(f_{s1})$, $G(f_{s1})$, $B(f_{s1})$ of the second aspect ratio at the first data rate $f_{s1}$ from the aspect ratio converting sections 100R, 100G, 100B of three systems. Since the respective color digital picture signals $R(f_{s1})$, $G(f_{s1})$, $B(f_{s1})$ of the first aspect ratio or the second aspect ratio outputted from the three systems of the aspect ratio converting sections 100R, 100G, 100B are all color digital picture signals $R(f_{s1})$, $G(f_{s1})$, $B(f_{s1})$ of the first data rate $f_{s1}$, it is possible to implement digital signal processing without switching the clock rate at the succeeding stage.

Further, the digital video camera apparatus of this embodiment includes a digital signal processing section 5 supplied with respective color digital picture signals $R(f_{s1})$, $G(f_{s1})$, $B(f_{s1})$ of the first aspect ratio or the second aspect ratio from the aspect ratio converting unit 100.

The digital signal processing section 5 is composed of a delay memory 51, a pre-processor 5Z, and an encoder 53, etc.

The delay memory 51 is comprised of delay memories of 2 channels and serves to deliver, to the pre-processor 52, respective green digital picture signals $G_{0H}$, $G_{1H}$, $G_{2H}$ and respective red digital picture signals $R_{0H}$, $R_{1H}$, $R_{2H}$ obtained by respectively delaying the green digital picture signal $G(f_{s1})$ and the red digital picture signal $R(f_{s1})$ by delay quantities of 0H (horizontal period), 1H, 2H.

Moreover, the pre-processor 52 is operative with the clock of the $f_{s1}$ rate being as a master clock to carry out image emphasis processing, addition of pedestal, non-linear processing such as gamma or knee, etc. or linear matrix processing with respect to respective color digital picture signals $R(f_{s1})$, $G(f_{s1})$, $B(f_{s1})$ to further carry out of well known implementation (realization) of high resolution corresponding to the Spatial Offset Method in the imaging section 1 to generate respective digital picture signals VF-Y $(f_{s1})$, DTL-O$(f_{s1})$, DTL-E$(f_{s1})$ for high resolution monitor from the respective color digital picture signals $R(f_{s1})$, $G(f_{s1})$, $B(f_{s1})$, and to generate luminance data $Y(f_{s1})$ and two color difference data R-Y$(f_{s1})$, B-Y$(f_{s1})$ to deliver them to the encoder 53.

Further, the encoder 53 generates digital picture signal VBS$(2f_{s1})$ for high resolution monitor from respective digital picture signals VF-Y$(f_{s1})$, DTL-O$(f_{s1})$, DTL-E$(f_{s1})$, and generates a color signal $C(f_{s1}/2, f_{s1}/2)$ from the color difference data R-Y $(f_{s1})$, B-Y$(f_{s1})$.

Further, luminance data $Y(f_{s1})$ and two color difference data, R-Y$(f_{s1})$, B-Y$(f_{s1})$ generated by the pre-processor 52 are changed into data in an analog form by a D/A converting section 6. They are outputted as analog component signals Y, R-Y/U, B-Y/V through a low-pass filter 7. Moreover, the luminance data $Y(f_{s1})$ generated by the pre-processor 52 and the color signal $C(f_{s1}/2, f_{s1}/2)$ generated by the encoder 53 are converted into a digital picture signal $Y(f_2)+C(f_{s2}/2, f_{s2}/2)$ of the $f_{s2}$ rate by a rate converter 8, and is then delivered to digital VTR (not shown). Further, the digital picture signal VBS $(2f_{s1})$ generated by the encoder 53 is delivered to high resolution monitor (not shown) through a low-pass filter 9.

The aspect ratio converting apparatus (unit) according to this invention will now be described.

Figure 4:
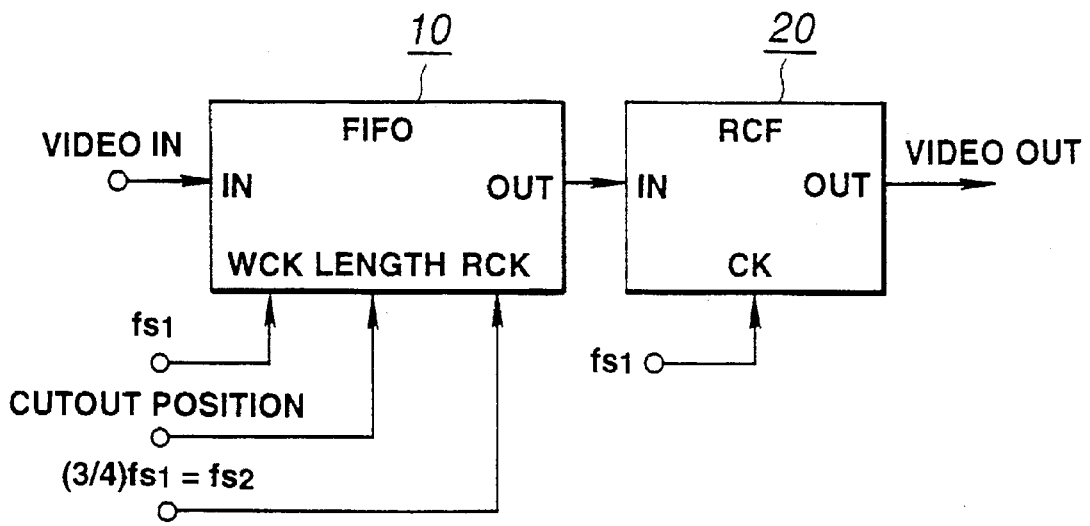
FIG. 4 is a block circuit diagram showing the fundamental configuration of an aspect ratio converting apparatus according to this invention.

The aspect ratio converting apparatus according to this invention is composed of a time axis converting section 10 and a data rate converting section 20 which are cascade-connected as the fundamental configuration is as shown in FIG. 4. This aspect ratio converting unit is provided in correspondence with respective color picture signals of the time axis converting sections 10R, 10G, 10B and data rate converting sections 20R, 20G, 20B shown in FIG. 1.

The aspect ratio converting unit shown in FIG. 4 serves to convert a digital picture signal Video in of the picture frame of the first aspect ratio (e.g., 16:9) into a digital picture signal Video out of the picture frame of the second aspect ratio (e.g., 4:3). The digital picture signal Video in of the first data rate is inputted to the time axis converting section 10.

The time axis converting section 10 implements time axis conversion processing to the digital picture signal Video in of the first data rate of the picture frame of the first aspect ratio to thereby generate a digital picture signal of the second data rate of the picture frame of the second aspect ratio.

Figure 5:
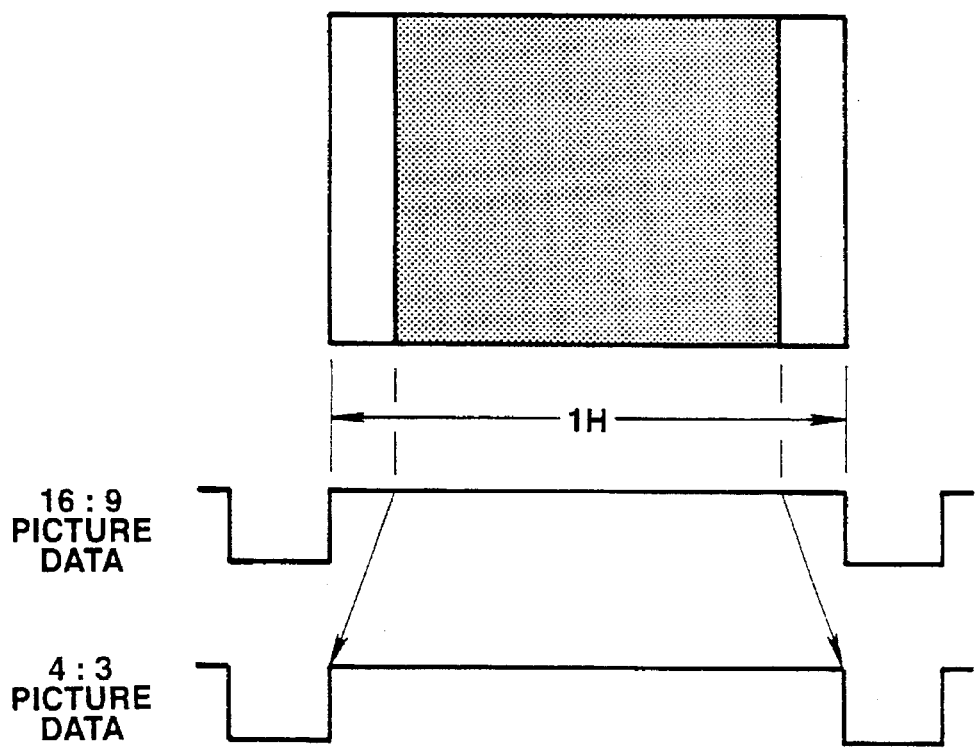
FIG. 5 is a view showing, in a model form, the state of extraction of picture frame in the aspect ratio converting apparatus.
Figure 6:
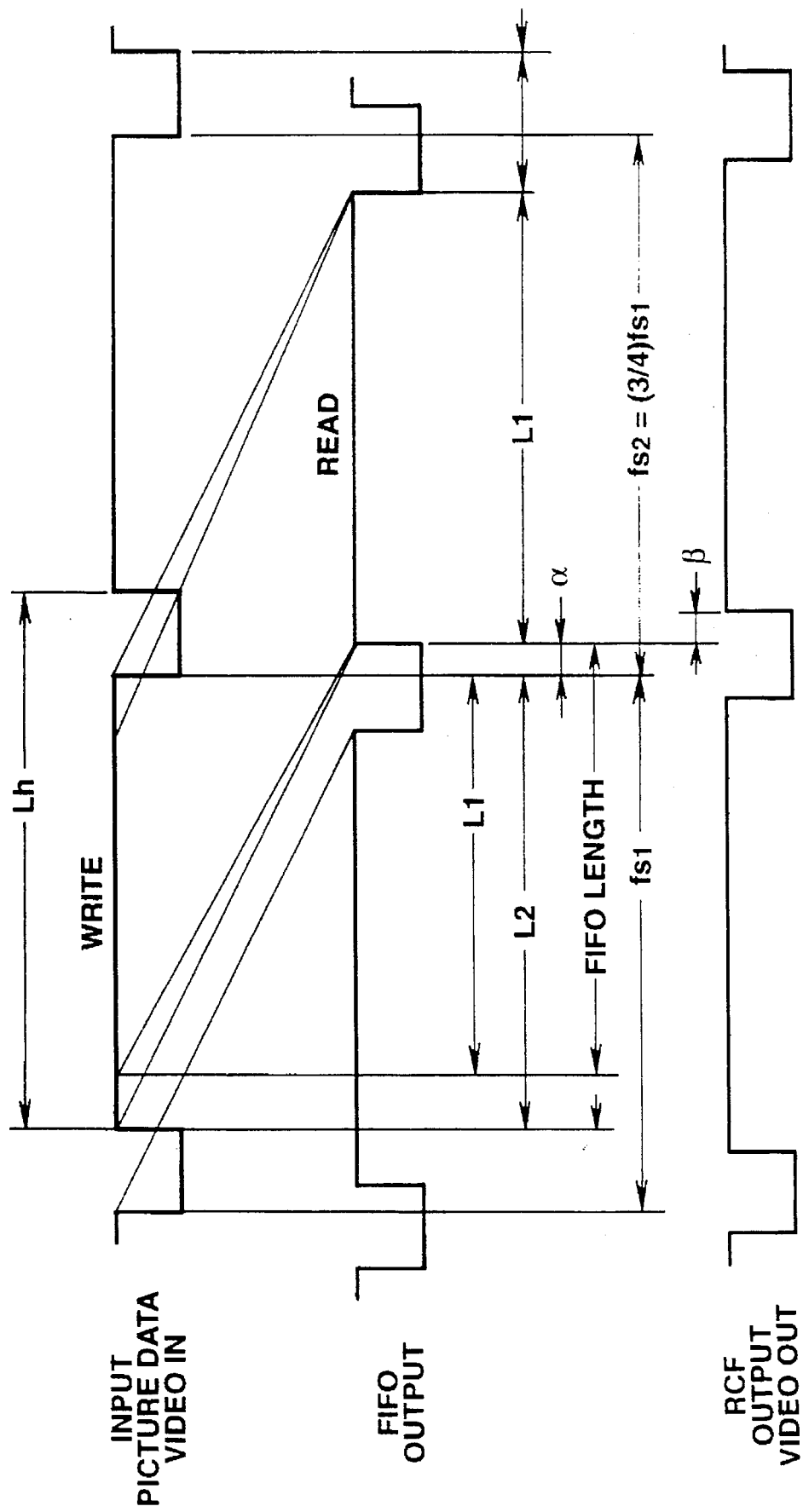
FIG. 6 is a view showing, in a model form, timings of extraction of picture frame in the aspect ratio converting apparatus.

This time axis converting section 10 is comprised of, e.g., a FIFO memory in which write and read operations of the memory cell are independently carried out, e.g., by write clock having first clock frequency $f_{s1}$ equal to the data rate of the digital picture signal Video in and read(-out) clock having second clock frequency $f_{s2}=(3/4)f_{s1}$ which is 3/4 times greater than the first clock frequency $f_{s1}$. This time axis converting section 10 writes the digital picture signal Video in of the first aspect ratio (16:9) into the FIFO memory by the write clock of the first clock rate and reads out the digital picture signal Video in from the FIFO memory by the read(-out) clock of the second clock rate to thereby extract picture frame of the second aspect ratio (4:3) from the picture frame of the first aspect ratio (16:9) as shown in FIGS. 5 and 6 to carry out time axis expansion processing of 4/3 times which outputs a digital picture signal of the second aspect ratio (4:3) at the second data rate. The position at which the picture frame of the second aspect ratio (4:3) is extracted from the picture frame of the first aspect ratio (16:9) is designated by setting FIFO length.

In this case, in FIG. 6, L1 is the number of FIFO stages corresponding to the number of valid data of 1H of the digital picture signal of the second aspect ratio (4:3), and L2 is the number of FIFO stages corresponding to the number of valid data of 1H of the digital picture signal of the first aspect ratio (16:9). In addition, the FIFO length is caused to be L1+α to designate the picture frame extracting position.

Moreover, the data rate converting section 20 carries out data rate conversion processing of conversion ratio of 3:4 with respect to the digital picture signal of the second data rate of the picture frame of the second aspect ratio (4:3) generated by implementing time axis conversion processing to the digital picture signal Video in of the first data rate of the picture frame of the first aspect ratio (16:9) in the time axis converting section 1 to thereby carry out data rate conversion processing of the conversion ratio of 3:4 to generate a digital picture signal of the first data rate of the picture frame of the second aspect ratio (4:3).

This data rate converting section 20 is comprised of a rate convert filter which sequentially carries out switching between filter coefficients at the output rate to carry out filtering processing, for example, as disclosed in the Japanese Patent Application Laid Open No. 6810/1994 publication, etc., and is operative to assume positive integer n to be, e.g., 2 to substantially carry out 4n (=8) times over-sampling and ⅓n (=⅙) down-sampling with respect to the digital picture signal of the picture frame of the second aspect ratio of 4:3, i.e., the digital picture signal of the second data rate generated by the time axis converting section 10 to thereby carry out data rate conversion processing of conversion ratio of 3:4 thus to generate a digital picture signal Video out of the picture frame of the second aspect ratio of 4:3 at the first data rate. In this case, the rate convert filter for sequentially carrying out switching between filter coefficients at the output rate to carry out filtering processing is comprised of pre-register type FIR filter or post-register type FIR filter.

As stated above, in the aspect ratio converting apparatus according to this invention, there is employed, in the time axis converting section 10, an approach to implement time axis conversion processing of 4/3 times to a digital picture signal of the first data rate indicating an image (pictorial image) of the first aspect ratio (16:9) to generate a digital picture signal of the second data rate indicating an image (pictorial image) of the second aspect ratio (4:3), and there is employed, in the data rate converting section 20, an approach to implement data rate conversion processing of conversion ratio of 3:4 to the digital picture signal of the second data rate, thereby making it possible to generate a digital picture signal of the first data rate indicating the image of the second aspect ratio (4:3) from the digital picture signal of the first data rate indicating the image of the first aspect ratio (16:9). In this case, the data rate converting section 20 substantially carries out 4n times over-sampling and ⅓n down-sampling with respect to the digital picture signal of the second data rate generated by the time axis converting section 10, thereby making it possible to carry out data rate conversion of conversion ratio of 3:4.

More practical embodiment of the aspect ratio converting apparatus according to this invention will now be described.

Figure 7:
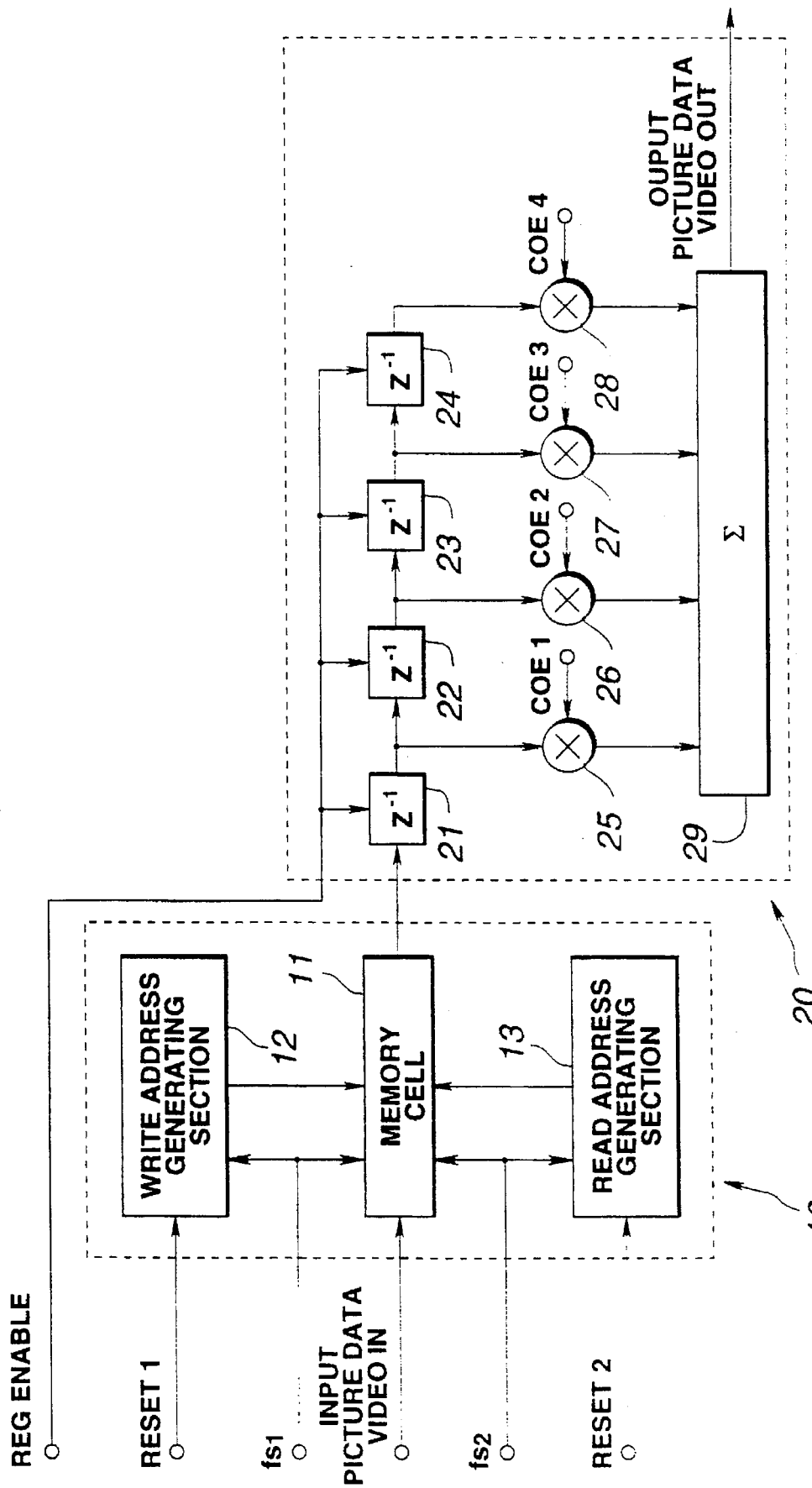
FIG. 7 is a block circuit diagram showing more practical configuration of the aspect ratio converting apparatus according to this invention.

The aspect ratio converting apparatus is composed of time axis converting section 10 using FIFO memory and data rate converting section 20 using pre-register type FIR filter as shown in more practical embodiment in FIG. 7, for example.

This aspect ratio converting apparatus serves to convert digital picture signal Video in of the picture frame of the first aspect ratio (16:9) into a digital picture signal Video out of the picture frame of the second aspect ratio (4:3), and is adapted so that the digital picture signal Video in of the first data rate is inputted to a memory cell 11 constituting the FIFO memory of the time axis converting section 10.

In this aspect ratio converting apparatus, the time axis converting section 10 is comprised of FIFO memory constituted by the memory cell 11, a write address generating section 12, and a read address generating section 13, wherein a write clock having a first clock frequency $f_{s1}$ equal to the data rate of the input digital picture signal Video in is delivered to the memory cell 11 and the write address generating section 12, and a read clock having a second clock frequency $f_{s2}=(3/4)f_{s1}$ which is 3/4 times greater than the first clock frequency $f_{s1}$ is delivered to the memory cell 11 and the read address generating section The write address generating section 12 sequentially generates write addresses synchronous with the write clock of the first clock frequency $f_{s1}$ to deliver these write addresses to the memory cell 11. Thus, the input digital picture signals Video in are sequentially written into the memory cell 11 by the first clock frequency $f_{s1}$. In this example, the write address generating section 12 is adapted to be reset at 1H period by the reset pulse Reset 1.

Figure 8:
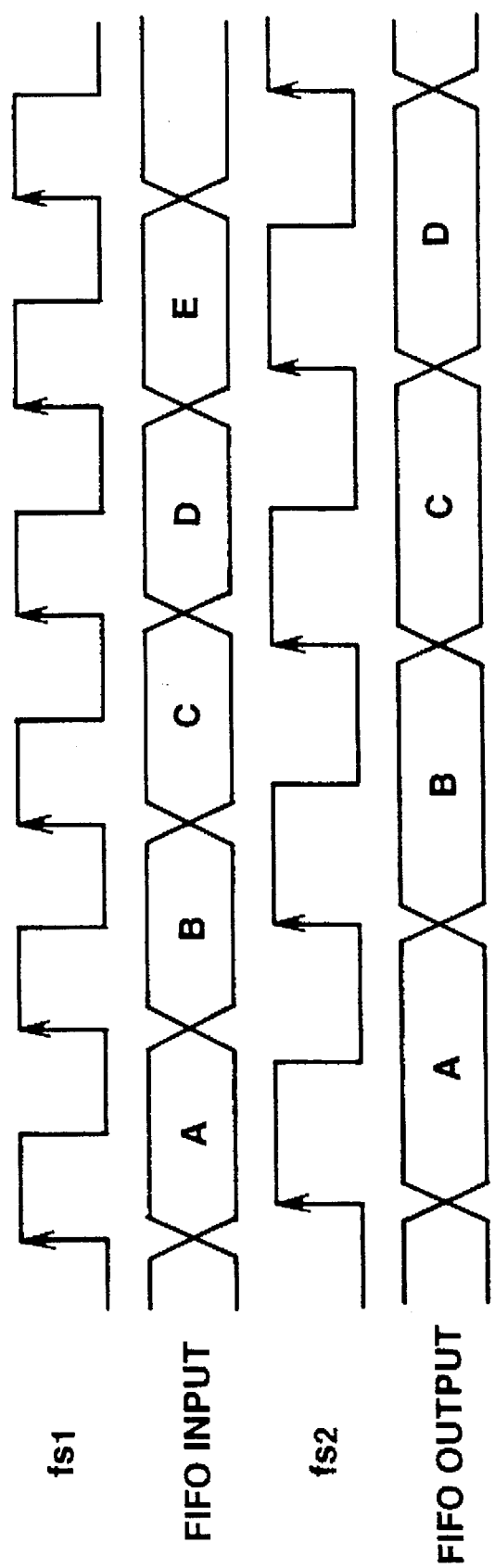
FIG. 8 is a view showing, in a model form, the operation timings of the aspect ratio converting apparatus shown in FIG. 7.

Moreover, the read address generating section 13 sequentially generates read addresses synchronous with the read clock of the second clock frequency $f_{s2}$ to deliver these read addresses to the memory cell 11. Thus, digital picture signals are sequentially read out at the second clock frequency $f_{s2}$, as shown in FIG. 8, from the memory cell 11. Namely, the digital picture signals of the second data rate are obtained. In this example, the read address generating section 13 is adapted to be reset at one horizontal period by the reset pulse Reset 2.

Further, the data rate converting section 20 is comprised of a pre-register type FIR filter composed of four stages of registers 21~24 cascade connected, four multipliers 25–28 for respectively multiplying respective delay outputs by the registers 21~24 by filter coefficients, and an adder 29 for adding respective delay outputs by the multipliers 25~28, wherein the digital picture signal of the second data rate of the picture frame of the second aspect ratio (4:3) generated by the time axis converting section 10 is delivered to respective multipliers 25~28 through the four stages of registers 21–24.

This data rate converting section 20 becomes operative by the clock of the first clock frequency $f_{s1}$ to sequentially carry out switching between filter coefficients delivered to the multipliers 25~28 at the output rate to substantially carry out octuple over-sampling and 1/6 down-sampling to thereby carry out data rate conversion processing of conversion ratio of 3:4 to generate a digital picture signal Video out of the picture frame of the second aspect ratio (4:3) at the first data rate.

In the aspect ratio converting apparatus of this embodiment, since the digital picture signal of the second data rate, i.e., (3/4) $f_{s1}$ rate is sampled by the clock of the first clock frequency $f_{s1}$ at the four stages of registers 21~24 of the data rate converting section 20, the contents of the four stages of registers 21–24 are as shown in FIG. 9. Namely, when the clock timings are respectively assumed to be t0, t1, t2, t3, t4, . . . , one four contents is repeated with respect to the other content. Accordingly, filter coefficients delivered to the multipliers 25~28 are caused to be [0] with respect to the repeated digital picture signals, and operation results of the remaining three multipliers are assumed to be valid. In this state, filter operation is carried out.

Figure 10:
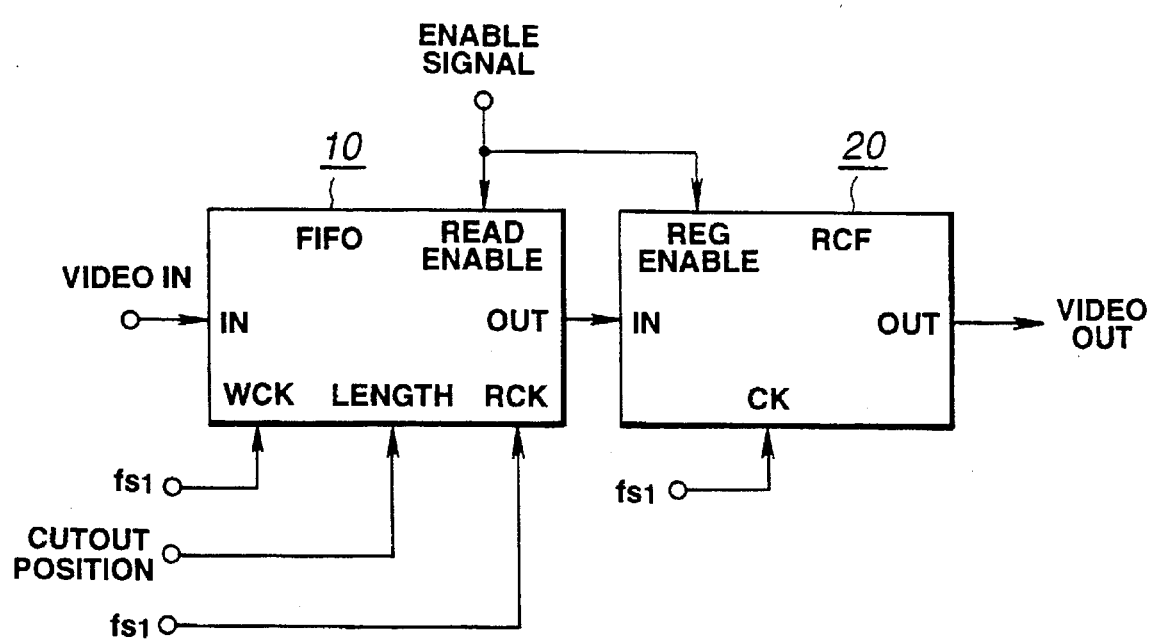
FIG. 10 is a block circuit diagram showing another configuration of the aspect ratio converting apparatus according to this invention.

Moreover, the aspect ratio converting apparatus according to this invention is constituted in FIG. 10, for example.

The aspect ratio converting apparatus shown in FIG. 10 serves to convert a digital picture signal Video in of the picture frame of the first aspect ratio (e.g., 16:9) into a digital picture signal Video out of the picture frame of the second aspect ratio (e.g., 4:3), wherein the digital picture signal Video in of the first data rate is inputted to the time axis converting section 10.

The time axis converting section 10 implements time axis conversion processing to the digital picture signal Video in of the first data rate of the picture frame of the first aspect ratio to thereby generate a digital picture signal of the second data rate of the picture frame of the second aspect ratio.

This time axis converting section 10 is comprised of, e.g., FIFO memory in which write and read operations of the memory cell are independently carried out by write clock and read clock having first clock frequency $f_{s1}$ equal to the data rate of the digital picture signal Video in.

In this time axis converting section 10, an enable signal for controlling read-out operation of data is delivered along with the write clock and the read clock of the first clock frequency $f_{s1}$ to stop, by the enable signal, read-out operation of data from the memory cell of the FIFO memory by the read-out clock once every four read-out operations to write the digital picture signal Video in of the first aspect ratio (16:9) into the FIFO memory by the write clock of the first clock rate, and to stop, by the enable signal, read-out operation of data from the memory cell of the FIFO memory by the read-out clock once every four operations to read out the digital picture signal Video in from the FIFO memory substantially by the second clock rate to thereby extract the picture frame of the second aspect ratio (4:3) from the picture frame of the first aspect ratio (16:9) to carry out time axis expansion processing of 4/3 times which outputs the digital picture signal of the second aspect ratio (4:3) at the second data rate.

Moreover, the data rate converting section 20 assumes positive integer n to be, e.g., 2 to carry out 4n (=8) times over-sampling and 1/3n (=1/6) down-sampling with respect to a digital picture signal of the second data rate of the picture frame of the second aspect ratio (4:3) generated by implementing time axis conversion processing to the digital picture signal Video in of the first data rate of the picture frame of the first aspect ratio (16:9) in the time axis converting section 10 to thereby carry out data rate conversion processing of conversion ratio of 3:4 to generate a digital picture signal Video out of the picture frame of the second aspect ratio of 4:3 at the first data rate.

Figure 11:
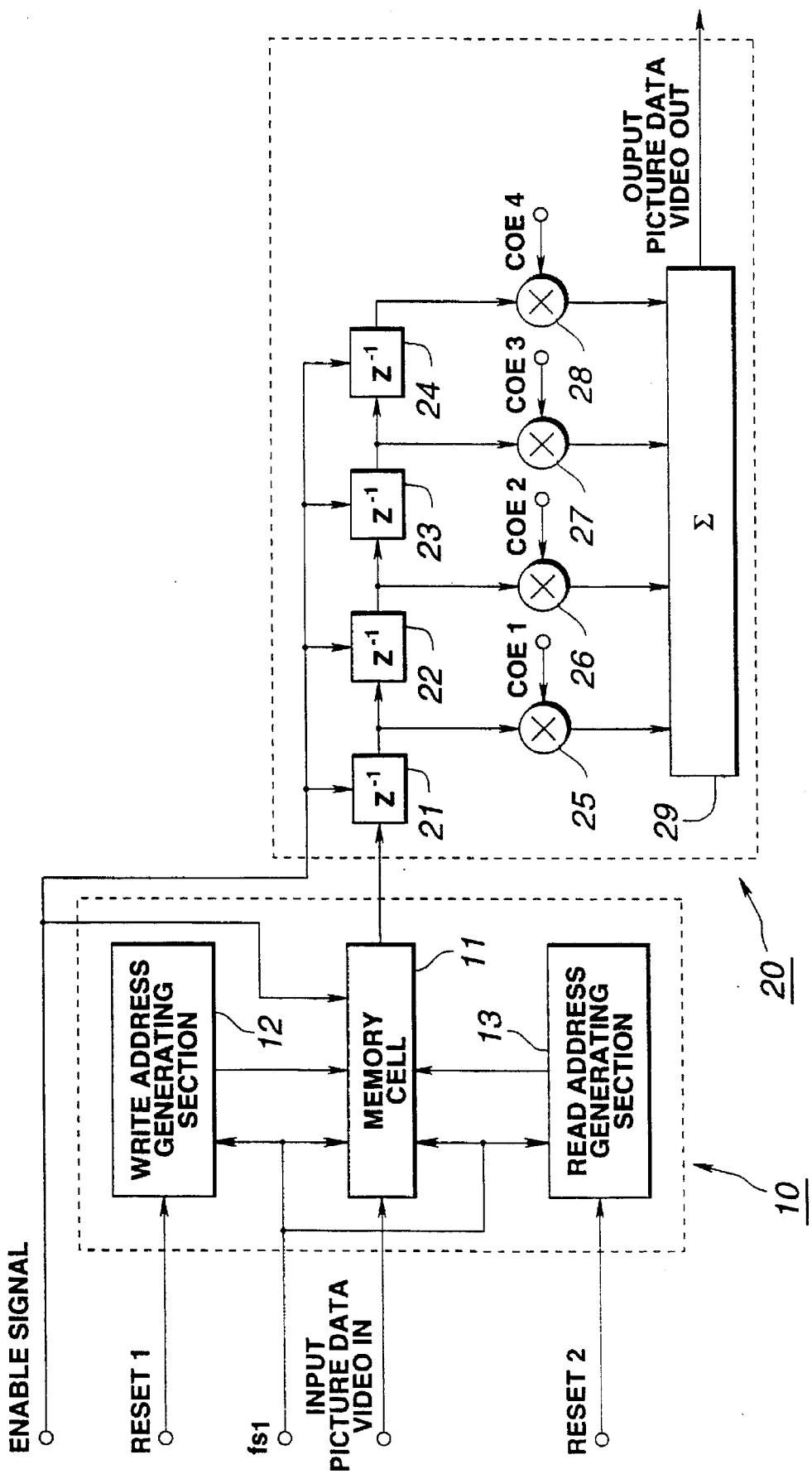
FIG. 11 is a block circuit diagram showing another more practical configuration of the aspect ratio converting apparatus according to this invention.

The aspect ratio converting apparatus is composed of time axis converting section 10 using FIFO memory and data rate converting section 20 using pre-register type FIR filter as shown in the more practical configuration in FIG. 11, for example.

This aspect ratio converting apparatus serves to convert the digital picture signal Video in of the picture frame of the first aspect ratio (16:9) into a digital picture signal Video out of the picture frame of the second aspect ratio (4:3), wherein the digital picture signal Video in of the first data rate is inputted to the memory cell 11 constituting the FIFO memory of the time axis converting section 10.

In this aspect ratio converting apparatus, the time axis converting section 10 is comprised of a FIFO memory constituted by the memory cell 11, write address generating section 12, and read address generating section 13, wherein write clock having first clock frequency $f_{s1}$ equal to the data Pate of the input digital picture signal Video in is delivered to the memory cell 11 and the write address generating section 12, and read clock having the first clock frequency $f_{s1}$ is delivered to the memory cell 11 and the read address generating section 13. Further, an enable signal to control read-out operation of data from the memory cell 11 by the read clock is delivered to the memory cell 11.

The write address generating section 12 sequentially generates write addresses synchronous with the write clock of the first clock frequency $f_{s1}$ to deliver these write addresses to the memory cell 11. Thus, the input digital picture signals Video in are sequentially written into memory cell 11 by the first clock frequency $f_{s1}$. In this example, the write address generating section 12 is adapted to be reset at one horizontal period by the reset pulse Reset 1.

Figure 12:
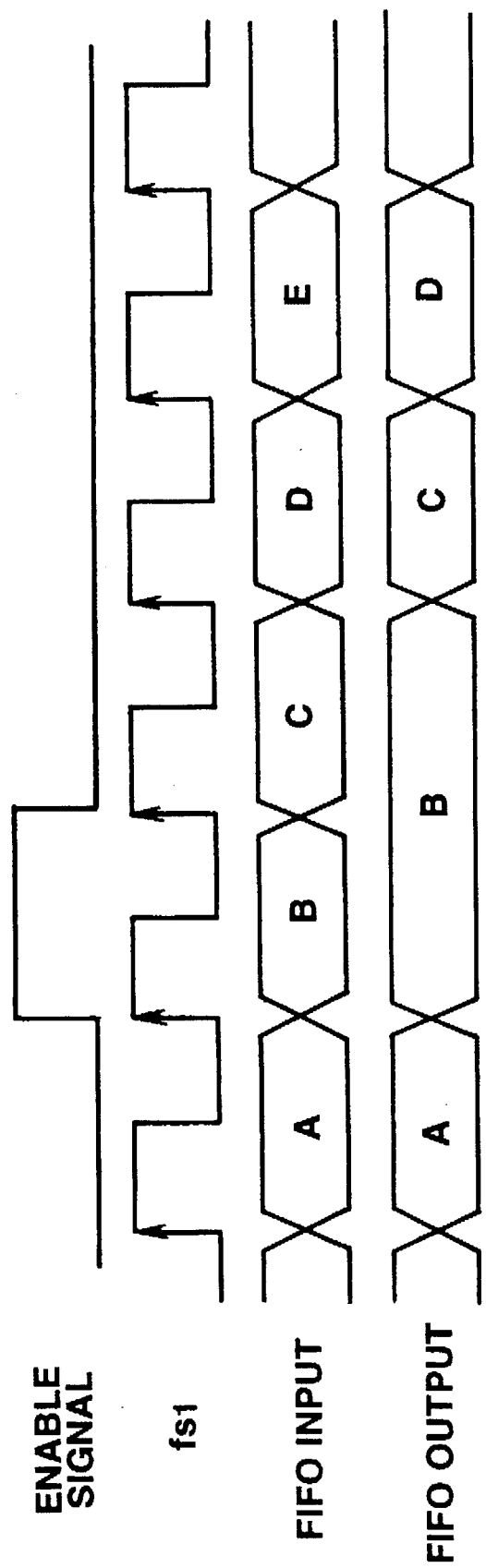
FIG. 12 is a view showing, in a model form, other operation timings of the aspect ratio converting apparatus shown in FIG. 11.

Moreover, the read address generating section 13 sequentially generates read-out addresses synchronous with the read clock of the first clock frequency $f_{s1}$ to deliver these read-out addresses to the memory cell 11. Further, as shown in FIG. 12, read-out operation of data from the memory cell 11 of the FIFO memory by the read(-out) clock of the first clock frequency $f_{s1}$ is stopped by the enable signal once every four operations to allow the data rate to be substantially equal to (3/4)$f_{s1}$ rate to thereby sequentially read out digital picture signals substantially at the second data rate from the memory cell 11. In this example, the read address generating section 13 is adapted to be reset at one horizontal period by the reset pulse Reset 2.

Moreover, the data rate converting section 20 is comprised, as shown in FIG. 11, of a pre-register type FIR filter constituted by four stages of registers 21~24 cascade-connected, four multipliers 25–28 for respectively multiplying respective delay outputs by the registers 21-24 by filter coefficients, and adder 29 for adding respective delay outputs by the multipliers 25~28, wherein the digital picture signal of the second data rate of the picture frame of the second aspect ratio (4:3) generated by the time axis converting section 10 is delivered to respective multipliers 25–28 through the four stages of registers 21~24.

This data rate converting section 20 becomes operative by the clock of the first clock frequency $f_{s1}$ to sequentially carry out switching between filter coefficients delivered to the multipliers 25~28 at the output rate to substantially carry out octuple over-sampling and 1/6 down-sampling to thereby carry out data rate conversion processing of conversion ratio of 3:4 to generate a digital picture signal Video out of the picture frame of the second aspect ratio (4:3).

In the aspect ratio converting apparatus of this embodiment, since there is employed, at the four stages of registers 21~24 of the data rate converting section 20, an approach to stop read-out operation of data by read(-out) clock of the first clock frequency $f_{s1}$ once every four operations to thereby provide a digital picture signal caused to substantially have second data rate to carry out sampling of such digital picture signal by the clock of the first clock frequency $f_{s1}$, contents of the four stages of registers 21~24 are all different from each other as shown in FIG. 13. Thus, the four multipliers 25~28 are caused to be effectively operative at all times, thus making it possible to efficiently carry out filter operation.

In this case, values shown in FIG. 14 or 15 are delivered as coefficients COE1~COE4 to data rate converting sections 20R, 20G, 20B constituted by the pre-register type FIR filter in the state where they are sequentially switched in accordance with the clock. In this example, sum totals of values of coefficients COE1~COE4 at respective timings are all equal to 64.

In this embodiment, the imaging section 1 is constituted by employing the Spatial Offset Method, and respective CCD image sensors 1R, 1B for imaging red picture image and blue picture image are disposed in such a manner that they are shifted in a horizontal direction by ½ of the spatial sampling period $\tau_s$ of pixel with respect to the CCD image sensor 1G for imaging green picture image.

In view of the above, coefficients COE1~COE4 shown in one of the FIGS. 14 and 15 mentioned above are applied to the data rate converting section 20G, and coefficients COE1~COE4 shown in one of the FIGS. 14 and 15 mentioned above are applied to the data rate converting sections 20R, 20B. Sum totals of values of coefficients COE1~COE4 at respective timings of the data rate converting sections 20R, 20G, 20B are caused to be all equal to each other as described above. By such an approach, the spatial sampling phase of the digital picture signal obtained from the data rate converting section 20G and the spatial sampling phases of the digital picture signals obtained from the data rate converting sections 20R, 20B are caused to be different by π. Thus, it is possible to implement filtering processing corresponding to the Spatial Offset Method.

Figure 16:
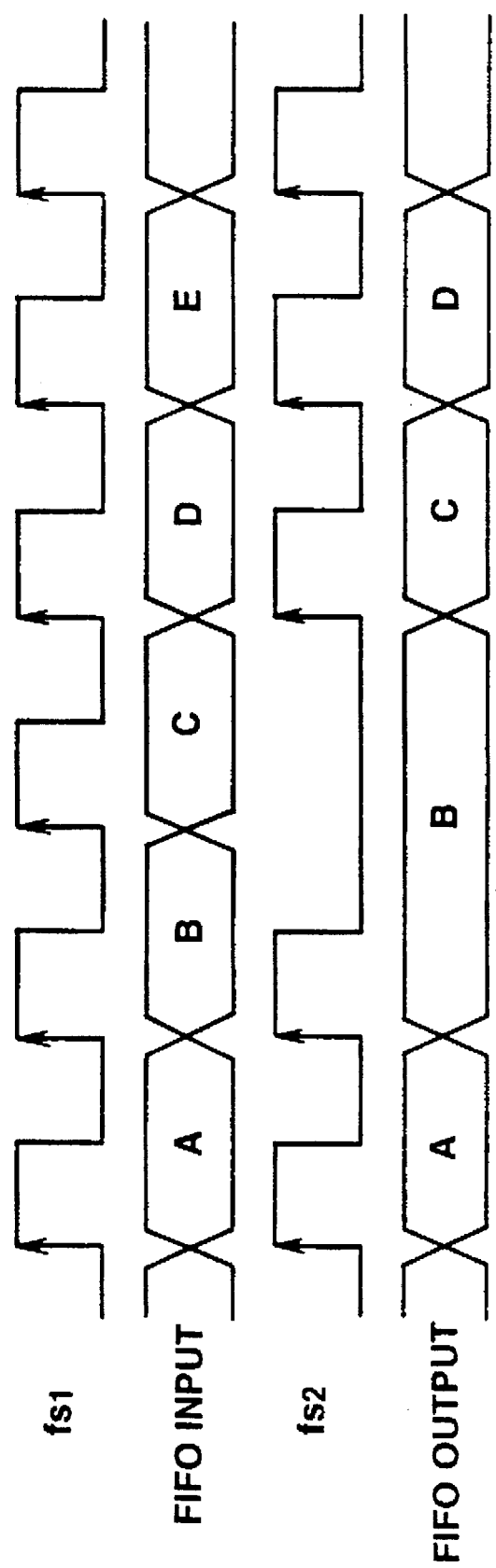
FIG. 16 is a view showing, in a model form, other operation timings of the aspect ratio converting apparatus according to this invention.

Moreover, while, in the aspect ratio converting apparatus of this embodiment, an approach is employed to stop read-out operation of data by the enable signal once every four operations to allow the data rate to be substantially $(3/4)f_{s1}$ rate to thereby sequentially read out digital picture signals substantially at the second data rate from the memory cell 11, even if read-out clocks caused to substantially have second frequency, i.e., $(3/4)f_{s1}$ rate by thinning write clocks of the first clock frequency $f_{s1}$ at a rate of one to four clock pulses are delivered to the FIFO memory constituting the time axis converting section 10 in place of the read-out control by the enable signal, it is possible to sequentially read out digital picture signals substantially at the second data rate from the memory cell 11 as shown in FIG. 16. Further, an approach is employed to take the digital picture signal of the second data rate into the data rate converting section 20 by the read-out clock, whereby contents of the four stages of registers 21~24 are caused to be all different from each other. Thus, these four multipliers 25–28 are caused to be effectively operative at all times, thereby making it possible to efficiently carry out filter operation.

What is claimed is:

1. A digital video camera apparatus comprising:
   imaging means for outputting an analog image pick-up signal;
   analog/digital converting means for converting the analog image pick-up signal into an input digital picture signal of a first data rate having a first aspect ratio; and
   aspect ratio converting means for converting the input digital picture signal into an output digital picture signal of the first data rate having a second aspect ratio different from the first aspect ratio,
   wherein the imaging means outputs a first analog image pick-up signal of a first sampling rate equal to the first data rate, and a second analog image pick-up signal of the first sampling rate different by a spatial sampling position from the first analog image pick-up signal,
   wherein the analog/digital converting means converts the first analog image pick-up signal into a first input digital picture signal of the first data rate having a first spatial sampling phase, and converts the second analog image pick-up signal into a second input distal picture signal of the first data rate having a second spatial sampling phase such that a phase difference between the first and second spatial sampling phases corresponds a difference of the spatial sampling position between the first and second analog image pick-up signals and
   wherein the aspect ratio converting means converts the first input digital picture signal into a first output digital picture signal having the second aspect ratio at the first data rate having a third spatial sampling phase, and converts the second input digital picture signal into a second output digital picture signal having the second aspect ratio at the first data rate having a fourth spatial sampling phase such that a phase difference between the third and fourth spatial sampling phases corresponds to the difference of the spatial sampling position between the first and second analog image pick-up signals.

2. The digital video camera apparatus as set forth in claim 1,
   wherein spatial sampling phase difference between the first analog image pick-up signal and the second analog image pick-up signal is π.

3. The digital video camera apparatus as set forth in claim 2,
   wherein spatial sampling phase difference between the first output digital picture signal and the second output digital picture signal is π.

4. The digital video camera apparatus as set forth in claim 1, further comprising selector means for selectively outputting the input digital picture signal and the output digital picture signal.

5. The digital video camera apparatus as set forth in claim 4, further comprising signal processing means for carrying out signal processing at a clock rate related to the first data rate with respect to a digital picture signal selected by the selector means.

6. The digital video camera apparatus as set forth in claim 5, wherein the signal processing means carries out the signal processing at the clock rate of multiple of integer of the first data rate.

7. The digital video camera apparatus as set forth in claim 1, wherein the first aspect ratio is 16:9, and the second aspect ratio is 4:3, and wherein the aspect ratio converting means includes:
time axis converting means for implementing time axis conversion to the input digital picture signal so as to form digital picture signal of a second data rate different from the first data rate having the second aspect ratio; and
data rate converting means for substantially processing over-sampling of 4n times in which n is a positive integer and down-sampling of 1/3n times with respect to the digital picture signal delivered from the time axis converting means.

8. The digital video camera apparatus as set forth in claim 1, wherein there are provided, every color signals of red, blue and green, three systems of the imaging means, the analog/digital converting means and the aspect ratio converting means, so that converting operations of aspect ratios are carried out every signals of respective colors.

9. The digital video camera apparatus as set forth in claim 1, wherein the aspect ratio converting means includes:
memory means for writing the input digital picture signal at a first clock rate equal to the first data rate and for reading out by a signal of the first clock rate which is thinned so that the thinned first clock rate is substantially equal to a second clock rate different from the first clock rate, to output a digital picture signal of a second data rate substantially equal to the second clock rate; and
data rate converting means for converting the digital picture signal of the second data rate outputted from the memory means into the output digital picture signal of the first data rate.

10. An aspect ratio converting apparatus comprising:

aspect ratio converting means for converting an input digital picture signal of a first data rate having a first aspect ratio into a digital picture signal of a second data rate different from the first data rate having a second aspect ratio different from the first aspect ratio; and data rate converting means for implementing data rate conversion to the digital picture signal delivered from the aspect ratio converting means to generate an output digital picture signal of the first data rate having the second aspect ratio, wherein the input digital picture signal includes a first input digital picture signal of the first data rate having a first spatial sampling phase and a second input digital picture signal of the first data rate having a second spatial sampling phase different by a spatial sampling position from the first input digital picture signal, wherein the aspect ratio converting means converts the first input digital picture signal into a first digital picture signal having the second aspect ratio at the second data rate having a third spatial sampling phase, and converts the second input digital picture signal into a second output digital picture signal having the second aspect ratio at the second data rate having a fourth spatial sampling phase such that a phase difference between the third and fourth spatial sampling phases corresponds to a difference of the spatial sampling position between the first and second input digital picture signals.

11. The aspect ratio converting apparatus as set forth in claim 10, wherein spatial sampling phase difference between the first input digital picture signal and the second input digital picture signal is $\pi$.

12. The aspect ratio converting apparatus as set forth in claim 10, wherein spatial sampling phase difference between the first digital picture signal and the second digital picture signal is $\pi$.

13. The aspect ratio converting apparatus as set forth in claim 10, wherein the first aspect ratio is 16:9, and the second aspect ratio is 4:3, and wherein the aspect ratio converting means includes:
time axis converting means for implementing time axis conversion for the input digital picture signal so as to form the digital picture signal of the second data rate having the second aspect ratio; and
wherein the data rate converting means substantially processes over-sampling of 4n times in which n is a positive integer and down-sampling of 1/3n times with respect to the digital picture signal delivered from the time axis converting means.

14. The aspect ratio converting apparatus as set forth in claim 10, wherein there are provided, every color signals of red, blue and green, three systems of the aspect ratio converting means and data rate converting means, so that converting operations of aspect ratios are carried out every signals of respective colors.

* * * * *